United States Patent Office 3,422,275
Patented Jan. 14, 1969

3,422,275
WATER TURBINES, PUMPS AND REVERSIBLE
PUMP TURBINES
Michael Braikevitch and Bruce Donald Arthur, Netherton, England, assignors to The English Electric Company Limited, London, England, a British company
Filed Oct. 19, 1965, Ser. No. 498,006
Claims priority, application Great Britain, Oct. 30, 1964, 44,385/64
U.S. Cl. 290—52
Int. Cl. H02p 9/04
10 Claims

ABSTRACT OF THE DISCLOSURE

A water turbine, pump, or reversible pump/turbine comprises two co-axial tubes having facing end flanges whose outer edges are sealed to the inner peripheral surface of the stator of a dynamo-electric machine so as to form a circumferential channel surrounding and in communication with the water tube in which channel the rotor of the dynamo-electric machine rotates.

---

The invention relates to water turbine, pump and reversible pump/turbine apparatus.

According to one aspect of the invention, there is provided a water turbine or pump or reversible pump/turbine apparatus, comprising a bladed runner adapted to be rotatably mounted within wall means defining a water passage, a dynamo-electric machine including a stator and a rotor, the stator being adapted to be mounted so as to surround said water passage so that its inner peripheral surface defines with outwardly directed portions of said wall means a circumferential channel communicating with the said passage, and the rotor being attached to the bladed runner so as to rotate therewith in the said circumferential channel.

According to another aspect of the invention, there is provided a water turbine or pump or reversible pump/turbine apparatus, comprising a bladed runner rotatably mounted within a tubular water passage, said water passage comprising two tubular portions having facing end flanges, a dynamo-electric machine including a stator and a rotor, the stator surrounding the said water passage so that its inner peripheral surface defines with the said end flanges a circumferential channel communicating with the said water passage, and the rotor being mounted on the periphery of the bladed runner so as to rotate therewith within said circumferential channel, and sealing means for preventing water leakage from the said circumferential channel.

An embodiment of the invention will now be described by way of example, and with reference to the accompanying drawing in which.

Figure 1:
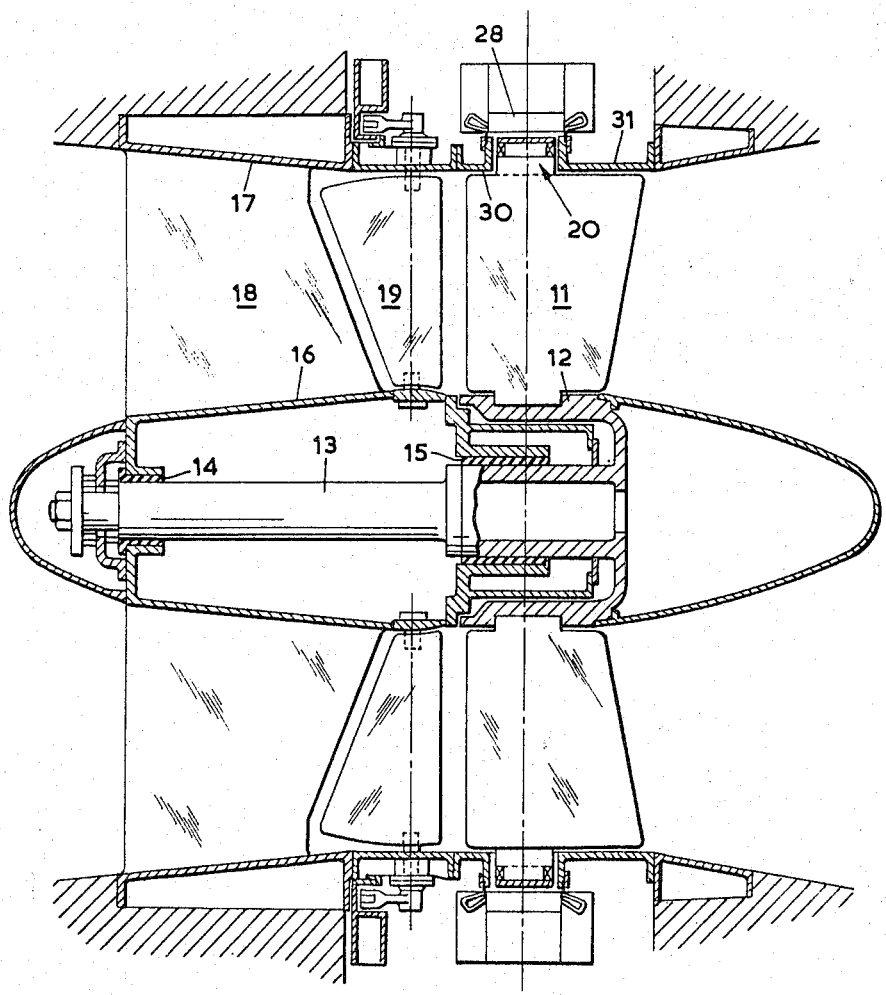
FIG. 1 shows a cross-section through a water turbine in accordance with the invention.

Referring to FIG. 1, the turbine comprises runner blades 11 mounted on a runner 12 which is carried on a shaft 13 mounted in bearings 14 and 15. The bearings are carried in a central structure 16 which is supported from an outer casing 17 through struts 18.

Upstream of the runner blades 11 there are adjustable guide vanes 19 pivotally mounted in the central structure 16 and outer casing 17.

Figure 2:
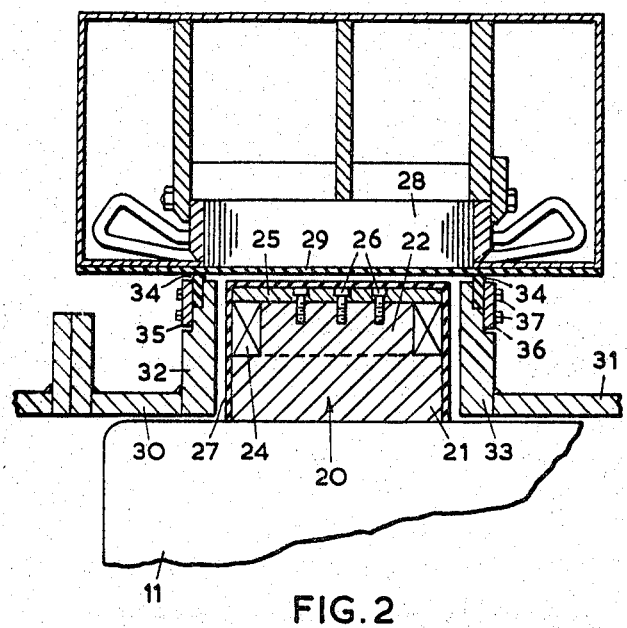
FIG. 2 shows a detail of part of FIG. 1.

Referring to FIG. 2 which shows the construction of a pole assembly of a salient pole generator, a rotor, generally indicated at 20, is mounted on the periphery of the runner blades 11 and runs in water. The rotor includes a solid steel ring 21 castellated on its outer periphery to form poles 22. Field coils 24 surround the poles 22 and are held in position by pole tips 25 having countersunk holes housing bolts 26 which attach the pole tips 25 to the poles 22. The field coils may alternatively be held in place by non-magnetic wedges between poles and at the axial ends of the poles by non-magnetic bolt on tips. The generator rotor 20 and the field coils 24 are encapsulated in synthetic resin 27 which is machined so that the rotor has the profile of a smooth cylinder.

A stator 28 is mounted to be concentric with the rotor 20, and a plastic membrane 29 is provided on the inner periphery of the stator. The plastic membrane may comprise a reinforced resin based material which is placed on the inner periphery of the stator and cured in position.

The outer casing 17 includes cylindrical parts 30, 31 which surround the blades 11, and radial walls 32, 33 adjacent the upstream and downstream faces of the rotor 20. The radial walls 32, 33 are preferably constructed from insulating material, or are laminated with insulating material, near the poles, so as to reduce any eddy currents induced by the rotor 20; they may be made of glass fibre material near the poles and of steel elsewhere, for example. Flexible annular sealing rings 34 are clamped between annular rings 35, 36 and the radial walls 32, 33 by bolts 37. The reduction in thickness of the rings by this clamping action increases the periphery of the sealing rings 34, thus forcing them outwards into sealing contact with the membrane 29.

It will be apparent that, in the construction described, the stator 28 provides one of the walls of a circumferential channel in which the rotor 20 rotates, the other walls of the circumferential channel being provided by the walls 32, 33. This arrangement simplifies the assembly of the apparatus (it will be appreciated that the diameter of the apparatus is of the order of 20 to 30 feet) and, in addition, the absence of any dividing wall between the rotor and the stator enables the air gap between these two components to be reduced to a minimum. In view of the size of the apparatus, the stator 28 is preferably constructed in a number, for example four, of segmental portions which are connected together on assembly, and the membrane 29 provides a seal which covers any gaps between the assembled segmental portions. The sealing rings 34 by being capable of being expanding outwardly into contact with the membrane 29, are able to seal any small gaps which exist between the ends of the walls 32 and 33 and the membrane 29. It will be seen that it is only necessary to achieve water tightness of two circumferential seals between the stationary rings 34 and the stationary membrane 29.

The membrane 29 may, instead of being made of reinforced resin based material, be built up from layers of adhesive waterproof tape, or may be rubber.

The annular sealing rings 34 are preferably made of rubber and preferably include at least one embedded layer of canvas material which enables the rubber to maintain its resilience continuously while under compression so that the peripheries of the rings 34 remain in sealing engagement with the membrane 29.

Figure 3:
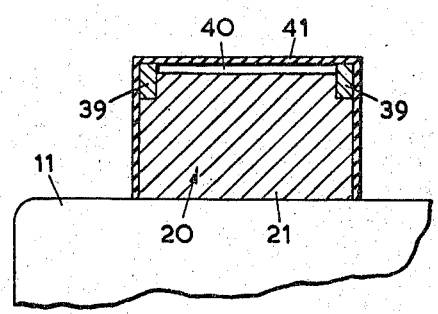
FIG. 3 shows a modification of FIG. 2.

FIG. 3 shows the construction of another embodiment of the invention in which the rotor and stator form an induction generator. The rotor 20 is of squirrel cage form and includes steel ring 21. Two end rings 39 are fixed to the ring 21 and are electrically connected by rotor bars 40 which lie in slots in the ring 21. The rotor 20 is encapsulated with synthetic resin 41 which is again machined to have a smooth cylindrical surface.

The encapsulated rotor may be enclosed in a stainless steel cover.

Instead of the arrangement shown, the runner 12 may be rotatably supported on bearings carried by the shaft 13 which is in this case stationary.

We claim:
1. An energy converter operable as one of the following, namely, a water turbine, a water pump and a reversible water pump/turbine, comprising
  two co-axially arranged tubular wall portions defining a water passage and having mutually facing outwardly directed end flanges which extend normally of the axis of the wall portions,
  a bladed runner,
  means rotatedly mounting the bladed runner within the water passage,
  a dynamo-electric machine including a ring shaped stator and a ring shaped rotor,
  means mounting the stator around the said water passage so that its inner peripheral surface defines the base of a circumferential channel which communicates with the said passage and whose sides are defined by the end flanges,
  means attaching the rotor to the periphery of the bladed runner so that it rotates therewith within the said circumferential channel, and
  sealing means for preventing water leakage between the outer ends of the flanges and the stator.

2. An energy converter according to claim 1, in which the said end flanges are at least partially made of electrically non-conducting material.

3. An energy converter according to claim 1, in which the said sealing means includes seals extending outwardly from the said end flanges into sealing engagement with the inner peripheral surface of the stator.

4. An energy converter according to claim 1, in which the said sealing means includes a waterproof layer covering the inner periphery of the stator to constitute the inner peripheral surface thereof.

5. An energy converter, comprising two co-axially mounted tubular wall portions defining a water passage and having spaced apart mutually facing outwardly directed end flanges:
  a bladed runner,
  means rotatably mounting the bladed runner within the water passage,
  a dynamo-electric machine including a ring shaped stator, having substantially the same internal diameter as the outer diameter of the said flanges, and a ring shaped encapsulated rotor,
  means attaching the rotor to the bladed runner so that it rotates therewith between the said mutually facing end flanges,
  means mounting the stator around the said tube and around the said rotor, and
  sealing means sealing the said end flanges to the inner peripheral surface of the stator so that the end flanges define the sides of, and the inner peripheral surface of the stator defines the base of, a circumferential channel communicating with the said water passage.

6. An energy converter according to claim 5, in which the said sealing means includes a pair of flexible rings having an outer diameter substantially the same as the diameter of the said end flanges,
  means respectively attaching the flexible rings to the said end flanges,
  and means compressing the rings so as to reduce their thickness, the consequential increase in the periphery of the rings forcing them outwardly into sealing engagement with the inner peripheral surface of the stator.

7. An energy converter according to claim 5, in which the stator comprises a plurality of segmental portions and in which the said sealing means includes a waterproof layer covering the inner periphery of the stator to constitute the inner peripheral surface thereof.

8. Apparatus according to claim 6, in which the said waterproof layer is a membrane of plastics material.

9. Apparatus according to claim 6, in which the said waterproof layer is a membrane of rubber material.

10. Apparatus according to claim 6, in which the said waterproof layer comprises waterproof tape adhesively secured to the said inner periphery of the stator.

References Cited

UNITED STATES PATENTS

| | | | |
|---|---|---|---|
| 2,436,683 | 2/1948 | Wood | 290—52 |
| 2,782,321 | 2/1957 | Fischer | 290—52 X |
| 3,231,768 | 1/1966 | Dannenmann | 310—86 |
| 2,814,254 | 11/1957 | Litzenberg | 310—86 X |
| 3,138,105 | 6/1964 | White | 310—86 X |
| 2,809,310 | 10/1957 | Dunn et al. | 310—86 |
| 3,256,829 | 6/1966 | Schneider | 310—86 X |

ORIS L. RADER, *Primary Examiner.*

G. SIMMONS, *Assistant Examiner.*

U.S. Cl. X.R.

103—87; 277—96; 310—86